United States Patent
Koehler et al.

(10) Patent No.: US 10,247,060 B2
(45) Date of Patent: Apr. 2, 2019

(54) CONTROL VALVE HAVING AN OUTFLOW CHANNEL

(71) Applicant: Schaeffler Technologies AG & Co. KG, Herzogenaurach (DE)

(72) Inventors: David Koehler, Egloffstein (DE); Jens Hoppe, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 79 days.

(21) Appl. No.: 15/540,624

(22) PCT Filed: Jan. 14, 2016

(86) PCT No.: PCT/DE2016/200010
§ 371 (c)(1),
(2) Date: Jun. 29, 2017

(87) PCT Pub. No.: WO2016/112906
PCT Pub. Date: Jul. 21, 2016

(65) Prior Publication Data
US 2018/0003090 A1    Jan. 4, 2018

(30) Foreign Application Priority Data
Jan. 15, 2015 (DE) .................. 10 2015 200 543

(51) Int. Cl.
*F01L 1/344* (2006.01)
*F16K 1/36* (2006.01)
(Continued)

(52) U.S. Cl.
CPC ............. *F01L 1/3442* (2013.01); *F01L 1/344* (2013.01); *F16K 1/36* (2013.01); *F16K 31/0613* (2013.01);
(Continued)

(58) Field of Classification Search
CPC ..... F01L 2001/3443; F01L 2001/34433; F01L 1/46; F01L 2101/00
(Continued)

(56) References Cited

U.S. PATENT DOCUMENTS 8,511,346 B2   8/2013   Scheidig et al.
8,733,305 B2 * 5/2014   Scheidig ............. F01L 1/34409
                                                        123/90.17
(Continued)

FOREIGN PATENT DOCUMENTS

DE    102008006179        7/2009
DE    102009024026 A1    12/2010
(Continued)

OTHER PUBLICATIONS

International Search Report of PCT/DE2016/200010, dated Apr. 21, 2016, 2 pages.

*Primary Examiner* — Jorge Leon, Jr.
(74) *Attorney, Agent, or Firm* — Davidson, Davidson & Kappel, LLC

(57) ABSTRACT

A control valve (1) for a camshaft adjustment device, and to an internal combustion engine having a camshaft adjustment device and a control valve (1) is provided. The control valve (1) includes a valve housing (3) and a pressure medium guiding insert (23) arranged coaxially in a recess of the valve housing (3). A discharge passage (27, 28) of the pressure medium guiding insert (23) transitions into a discharge duct (22) running in the axial direction, wherein the discharge connection T can be connected to the control connections A, B and wherein the discharge connection T is arranged in a region between the second end (8), which is opposite the first end (6), and the control connections A, B.

10 Claims, 2 Drawing Sheets

(51) Int. Cl.
*F16K 31/06* (2006.01)
*F01L 1/46* (2006.01)

(52) U.S. Cl.
CPC ......... *F01L 1/46* (2013.01); *F01L 2001/3443* (2013.01); *F01L 2001/34433* (2013.01); *F01L 2101/00* (2013.01)

(58) Field of Classification Search
USPC ...................................................... 123/90.17
See application file for complete search history.

(56) References Cited

U.S. PATENT DOCUMENTS

| | | | |
|---|---|---|---|
| 8,757,114 B2 | 6/2014 | Hoppe et al. | |
| 8,839,820 B2 * | 9/2014 | Hoppe | F01L 1/34 123/90.17 |
| 8,863,710 B2 | 10/2014 | Bayrakdar | |
| 8,910,603 B2 | 12/2014 | Bayrakdar | |
| 2007/0056540 A1 * | 3/2007 | Hoppe | F01L 1/3442 123/90.17 |
| 2007/0095315 A1 | 5/2007 | Hoppe et al. | |
| 2009/0230337 A1 | 9/2009 | Hoppe et al. | |
| 2010/0000479 A1 * | 1/2010 | Strauss | F01L 1/3442 123/90.17 |

FOREIGN PATENT DOCUMENTS

| | | |
|---|---|---|
| DE | 102009039384 | 3/2011 |
| DE | 102011003556 | 8/2012 |
| WO | WO2008006717 | 1/2008 |

* cited by examiner

CONTROL VALVE HAVING AN OUTFLOW CHANNEL

The present invention is directed to the field of proportional directional control valves, which may be used as a central valve, in particular for controlling so-called camshaft adjusters. Camshaft adjusters are used for controlling the operation of an internal combustion engine by influencing the charge cycle in a targeted manner: An adjustment of the phase position of the camshaft changes its position in relation to the phase position of the crankshaft; the opening and closing times of the gas exchange valves may thus be shifted to an earlier or later point in time of the run-through cyclical process. Central valves have multiple switching positions, with the aid of which the course of a pressure medium path may be adjusted between an inflow and an outflow; the pressure medium flow exerts a force on the camshaft adjuster that is a function of the switching position, and effectuates an adjustment into a certain position.

BACKGROUND

DE 10 2009 024 026 A1 provides a control valve for a camshaft adjuster, including a hollow cylindrical control piston that is displaceably guided within a valve housing. A hydraulic double check valve which unblocks a first pressure medium line in the inflow direction, and which includes a closing part having a sealing surface, and via which the inflow opening is closable in the return direction, is situated within the piston cavity. The pressure medium arrives at one of control connections A or B via the inflow connection and the piston cavity. The discharge of the pressure medium from control connection A or B takes place via one of the two outflow connections, each associated with one of the control connections. The outflowing pressure medium is conducted via the outflow connection of the control valve into the cylinder head or the chain case.

SUMMARY OF THE INVENTION

It is an object of the present invention to provide a control valve and an internal combustion engine that includes a control valve having optimized installation space requirements.

The present invention provides a control valve for a camshaft adjuster, with a valve housing that includes an inflow connection P, two control connections A and B, and an outflow connection T, and a pressure medium-conducting insert, coaxially situated in a receptacle of the valve housing, that includes an inflow passage, an outflow passage, and two control passages, and a control piston which is coaxially guided in the pressure medium-conducting insert and which has an inflow groove, an outflow groove, and a control groove on its outer circumference, the control piston including a piston head that forms an actuating surface on its front side and defines a first end of the control valve on the actuation side. The outflow passage merges into an outflow channel that extends in the axial direction, via which at least one of control connections A, B may be brought into connection with outflow connection T, and outflow connection T is situated in an area between the second end, opposite from the first end, and control connections A, B.

Outflow connections establish a controllable connection between the control connections and the surroundings of the control valve; the hydraulic medium is resupplied to the hydraulic medium circuit of the internal combustion engine in this way. The discharge of the hydraulic medium via the control valves generally takes place via separate outflow connections, each associated with one of the control connections. Alternatively, discharge of the hydraulic medium from multiple control connections may take place via a shared outflow connection. However, the described hydraulic medium path generally requires a shared pressure medium line through the piston cavity, which, as a hydraulic medium path, therefore can no longer be utilized for other purposes.

According to the findings of the present invention, a shared outflow connection may be implemented without the outflowing hydraulic medium having to be conducted via the piston cavity: The outflow passage merges into an outflow channel that extends in the axial direction, whereby the outflow connection may be brought into connection with control connection A, B; the location of the outflow connection may thus be freely selected, and the selection that is made does not result in any limitations for the design of the other hydraulic medium paths. At the same time, the required installation space as well as the manufacturing costs are optimized by using a pressure medium-conducting insert.

The hydraulic medium flowing out via control connections A, B is conducted via the outflow channel to the outflow connection, which is situated in an area between the second end, opposite from the first end, and control connections A, B. The control valve is preferably designed as a central valve that is coaxially insertable into a borehole of a camshaft. The outflowing hydraulic medium may thus preferably be supplied to a cavity in the camshaft, for example a pressure medium line or a volume accumulator.

In one advantageous specific embodiment, the outflow channel is at least partially enclosed by the pressure medium-conducting insert, the external dimensions of the pressure medium-conducting insert being adapted to the internal dimensions of the receptacle of the valve housing, and the outflow channel being formed at the interface between the valve housing and the pressure medium-conducting insert. With the aid of the provided configuration, the installation space may be optimized in a particularly cost-effective manner, in that the inner circumferential surface of the valve housing and the configuration of the outer circumferential surface of the pressure medium-conducting insert cooperate.

In another advantageous specific embodiment, the pressure medium-conducting insert includes a radially interior sleeve-shaped component and an exterior sleeve-shaped component, the outer sleeve-shaped component being manufactured as an injection-molded part and the inner sleeve-shaped component being designed as an insert component that is extrusion-coated by the outer component during the injection molding process for the latter. The provided configuration has particular advantages for manufacturing, and also allows the implementation of complex conducting geometries. The interior component is preferably made of a metallic material, and the exterior component, of plastic. Alternatively, the pressure medium-conducting insert may be manufactured in one piece from steel or plastic.

In one advantageous implementation, inflow connection P may be brought into fluidic connection with the control groove and control connection A, B via the inflow passage, the inflow groove, and the piston cavity. In this specific embodiment there are particular advantages from the provided control valves, in that, despite inflow of the hydraulic medium via the piston cavity, a shared outflow of the hydraulic medium from control connections A, B is made possible. A hydraulic medium path leads from inflow connection P via the inflow passage into the inflow groove. A first piston opening in the inflow groove allows communication with the piston cavity, through which the hydraulic medium arrives in the control groove via a second piston opening, and from there to control connections A or B via control passage A, B, respectively. The outflow from control connections A or B takes place, respectively, via control passage A or B to outflow grooves A or B, and from there, in each case via a passage at the groove base of the outflow channel, into the outflow channel to outflow connection T.

In another advantageous specific embodiment, inflow connection P is situated in the area of the second end of the control valve, a first control connection A and a second control connection B adjoining axially in the direction of the first end, and outflow connection T being situated in the direction of the second end. In another implementation, the control piston has a circumferential inflow groove in the area of the second end, in each case a circumferential outflow groove A, a control groove, and an outflow groove B adjoining axially in the direction of the first end. Despite inflow of the hydraulic medium via the piston cavity, the hydraulic medium flowing out via control connection B, remote from the second end, may arrive at outflow connection T situated in the area of the second end.

In one advantageous refinement, the outflow connection is situated in the area of the second end, at the front side of the control valve. The outflow connection is preferably centrally situated at the front side and fed by the outflow channel. The outflow channel, which extends essentially in the axial direction, may merge into a radial guide, in the area of the second end, which allows a connection between the centrally situated outflow connection and the outflow channel.

In another advantageous refinement, a check valve that is made up of a spring strip with overlapping ends that is wound to form a cylindrical valve spring is situated within the piston cavity. Pressure peaks, which result from camshaft alternating torques, for example, and which may be transmitted to the control valve via a camshaft adjuster, may be smoothed with the aid of the check valve.

The present invention also provides an internal combustion engine that contains a camshaft adjustment device, and a control valve that includes a valve housing which is situated in a receptacle of a camshaft and which includes an outflow connection T, two control connections A and B, and an inflow connection P situated within the camshaft, and a pressure medium-conducting insert, situated in a receptacle of the valve housing, that has an inflow passage, an outflow passage, and two control passages, and a control piston which is guided in the pressure medium-conducting insert and which on its outer circumference has an inflow groove, an outflow groove, and a control groove, characterized in that the outflow passage merges into an outflow channel that extends in the axial direction, whereby outflow connection T may be brought into connection with control connection A, B, and outflow connection T is connected, via a connection in the camshaft, to a cavity, a hydraulic medium line, or a volume accumulator. The cavity, a hydraulic medium line, and/or volume accumulator may be situated inside or outside the camshaft. A volume accumulator is preferably fed within the camshaft.

Accordingly, the control valve is preferably designed as a central valve for controlling a camshaft adjuster; it is thus situated in a cavity in the camshaft and rotates along with same. Camshaft adjusters having the design of a vane cell adjuster, for example, contain a stator and a rotor as essential elements. The stator is rotatably fixedly connected to a drive wheel, and is driven by the crankshaft via a traction drive. The rotor forms the output element.

In other respects, the control valve of the claimed internal combustion engine may have the same design as the control valve, described above, in the approach according to the present invention.

BRIEF DESCRIPTION OF THE DRAWINGS

The present invention is now explained in greater detail based on one exemplary embodiment, with reference to the drawings. Functionally equivalent elements of the explained specific embodiments are denoted by the same reference numerals.

DETAILED DESCRIPTION

Figure 1:
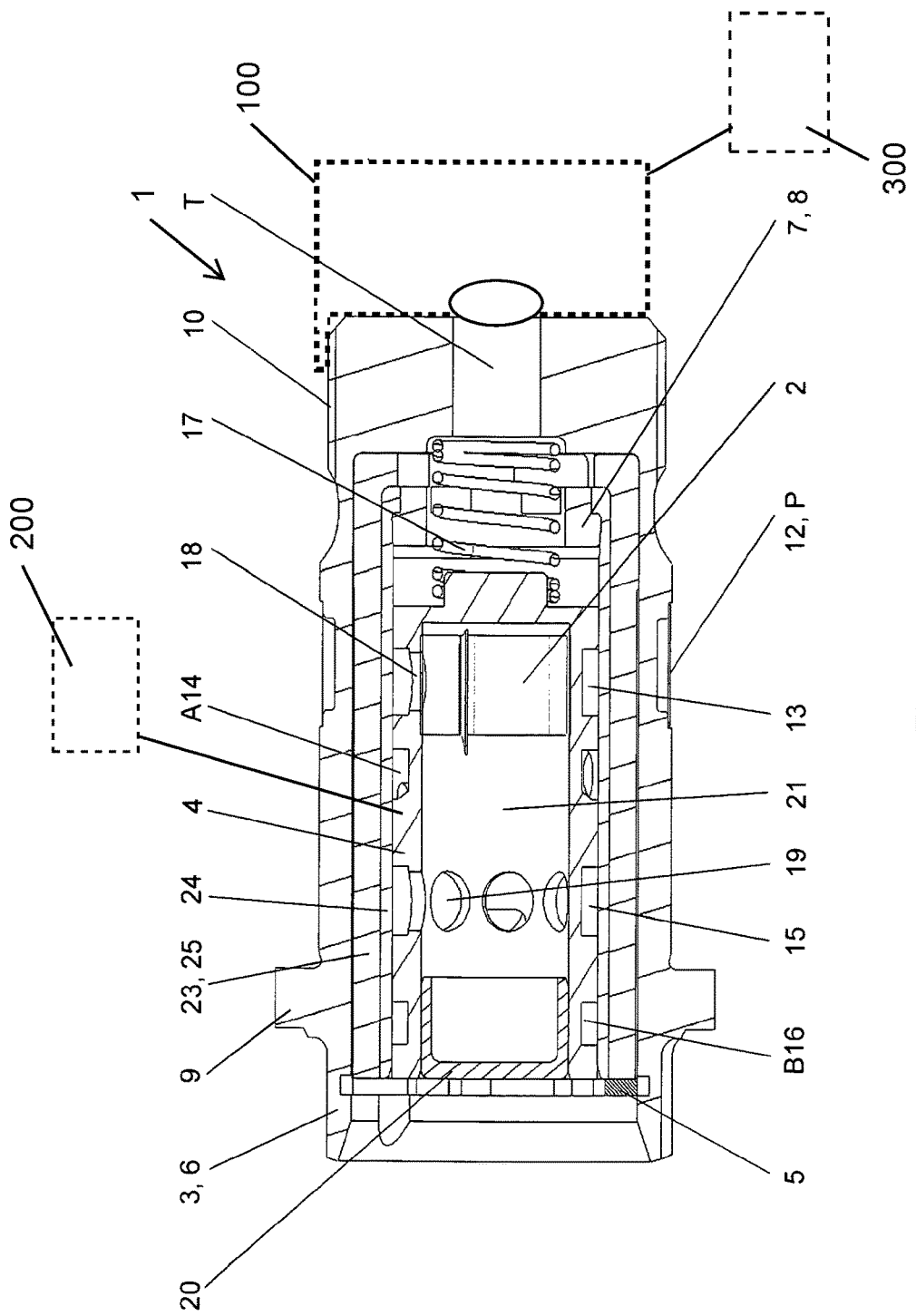
FIG. 1 shows a longitudinal section of the control valve.

FIG. 1 shows in the longitudinal section one specific embodiment, by way of example, of a control valve 1 which includes a check valve 2. Control valve 1 is made up of a valve housing 3 and a hollow cylindrical control piston 4 that is axially movably guided in a corresponding cavity in valve housing 3. The adjustment range of control piston 4 is axially delimited by a locking ring 5 on first end 6 and by an end element 7 on second end 8. Valve housing 3 may be accommodated by a cavity in a camshaft 100 and used for controlling a camshaft adjuster 200 for an internal combustion engine 300. A flange 9 together with an external thread 10 is used to connect control valve 1 to the camshaft 100. Valve housing 3 has three openings on its outer circumference: The openings form inflow connection P, as well as first supply connection A, and second supply connection B. An outflow connection T is situated at second end 8 of the valve housing. A filter 12 is situated in the area of the opening, which forms inflow connection P.

Control piston 4 on its outer circumferential surface has five sections with an expanded diameter, which include four sections with a reduced diameter. These, together with the inner circumferential surface of the valve housing, form a first, a second, a third, and a fourth circumferential annular channel, i.e., inflow groove 13, outflow groove A14, control groove 15, and outflow groove B16, respectively. For controlling camshaft adjuster 200, control piston 4 may assume different switching positions that are characterized by the actual pattern of possible pressure medium paths. A switching position is implemented with the aid of an actuator device, which generally is an electromagnetically activated actuator.

A push rod which is connected to an armature of the electromagnet is brought into contact with an actuating surface at the front side of the control piston; the force acting on the armature is thus transmitted via the push rod to the control piston and effectuates its axial displacement against the force of a spring 17: The first annular channel/inflow groove 13 may thus be brought into connection with inflow connection P, and the second annular channel/outflow groove A14 may be brought into connection with control connection A. The third annular channel/control groove 15 may be brought into connection with first control connection A, with second control connection B, with both, or with neither.

A first through opening 18 is provided on the groove base of inflow groove 13, which forms the first annular channel, and a second through opening 19 is provided on the groove base of the control groove that forms the third annular channel. Except for first and second through openings 18, 19, control piston 4 is closed on the side facing away from the spring by a pressure piece 20. Hydraulic medium may thus be conducted via inflow connection P into piston cavity 21, and from there to control connections A, B. Control connection A may be brought into connection with outflow connection T via the second annular channel/outflow groove A14 and via outflow channel 22, and control connection B may be brought into connection with outflow connection T via the fourth annular channel/outflow groove B16 and via outflow channel 22.

Figure 2:
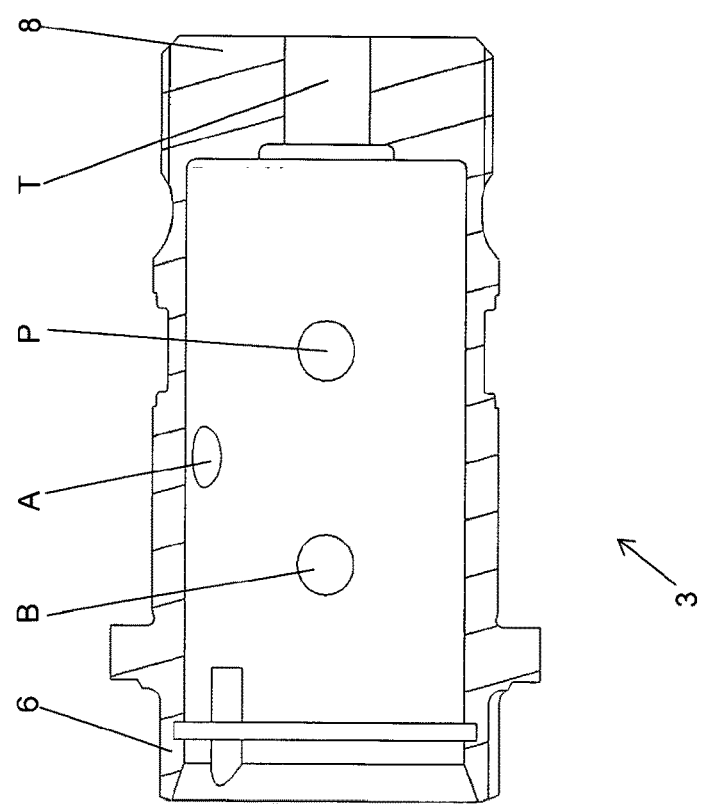
FIG. 2 shows a longitudinal section of the valve housing of the control valve from FIG. 1.

FIG. 2 shows a detailed view of valve housing 3. First and second ends 6, 8 of the control valve are illustrated. Control connections A, B, situated axially and offset over the circumference, as well as inflow connection P are apparent on the inner circumferential surface of valve housing 3. A borehole that forms outflow connection T extends coaxially in the area of second end 8.

As shown in FIG. 1, control piston 4 is guided within a pressure medium-conducting insert 23. Pressure medium-conducting insert 23 includes an interior component 24 and an exterior component 25. Interior component 24 is made of a metallic material and is enclosed by an exterior component 25 made of plastic. Both components have a sleeve-shaped or hollow cylindrical design. Outer sleeve-shaped component 25 is manufactured as an injection-molded part, and inner sleeve-shaped component 24 is designed as an insert component that is extrusion-coated by the outer component during the injection molding process for the latter.

Figure 3:
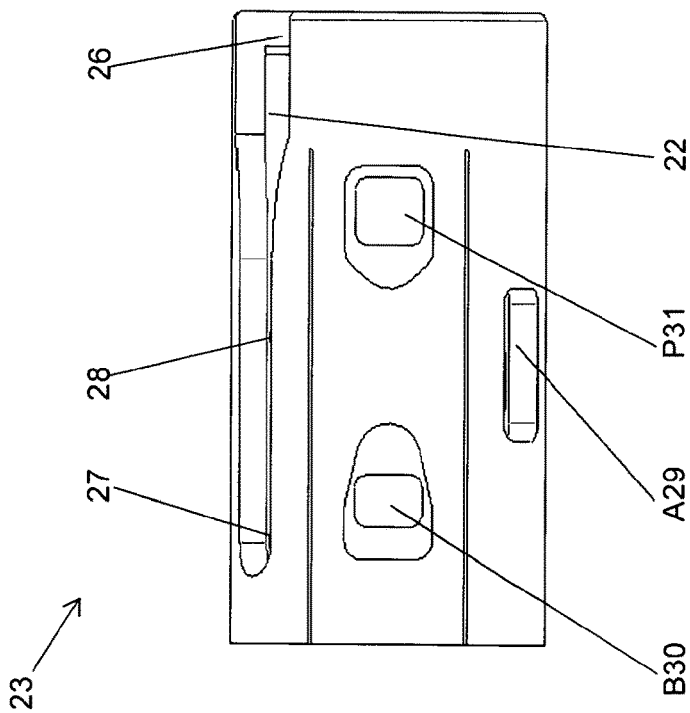
FIG. 3 shows a longitudinal section of the pressure medium-conducting insert of the control valve from FIG. 1.

FIG. 3 illustrates a detailed view of pressure medium-conducting insert 23. An outflow channel 22 that extends along the circumference in the axial direction is formed on the outer circumference. On the side of pressure medium-conducting insert 23 facing second end 8 of control valve 3, axial outflow channel 22 opens into a radially extending channel 26, via which a connection to outflow connection T may be established. On the side of pressure medium-conducting insert 23 facing first end 8 of the control valve, outflow channel 22 is closed on the end-face side. Two outflow passages 27, 28, via which a connection between outflow connection T, outflow grooves A14 and B16, and control connections A and B may be established, are situated on the base of the groove that forms outflow channel 22 together with the inner circumferential surface of the valve housing. The control connections are connected to the piston cavity via control passages A29 and B30, and the inflow connection is connected to the piston cavity via inflow passage P31.

As shown in FIG. 1, a check valve 2 that is made up of a spring strip with overlapping ends that is wound to form a cylindrical valve spring is situated within the piston cavity. Due to the winding of the spring strip, an interior end and an exterior end as well as an inner surface and an outer surface of the spring strip are defined, the spring strip at its interior end merging into an axially extending spacer element whose axial ends may be brought into contact with the inner side of the end faces of the control piston. The spacer element is formed by a tongue-like channel having an arch-shaped cross section.

The axial position of the spring strip within the piston cavity is fixed in such a way that the outer surface of the spring strip in the area of first through opening 18 may be brought into contact with the inner circumferential surface of control piston 4. First through opening 18 may be closed in this way: In the inflow direction, first through opening 18 is unblocked, so that pressure medium may enter piston cavity 21, whereas in the reverse direction, check valve 2 blocks. Pressure peaks are not passed into the area of the inflow line.

LIST OF REFERENCE NUMERALS 1 control valve
2 check valve
3 valve housing
4 control piston
5 locking ring
6 first end
7 end element
8 second end
9 flange
10 external thread
12 filter
13 inflow groove
14, A14 outflow groove A
15 control groove
16, B16 outflow groove B
17 spring
18 first through opening
19 second through opening
20 pressure piece, piston head
21 piston cavity
22 outflow channel
23 pressure medium-conducting insert
24 interior component
25 exterior component
26 radially extending channel
27 outflow passage
28 outflow passage
29, A29 control passage A
30, B30 control passage B
31, P31 inflow passage P
100 camshaft
200 camshaft adjuster
300 internal combustion engine
A control connection A
B control connection B
P inflow connection P
T outflow connection T

What is claimed is:

1. A control valve for a camshaft adjustment device, comprising:
   a valve housing including an inflow connection P, two control connections A and B, and an outflow connection T;
   a pressure medium-conducting insert, coaxially situated in a receptacle of the valve housing, the pressure medium-conducting insert having an inflow passage, an outflow passage, and two control passages; and
   a control piston coaxially guided in the pressure medium-conducting insert and having an inflow groove, an outflow groove, and a control groove on an outer circumference, the control piston including a piston head forming an actuating surface on a front side and defining a first end of the control valve on an actuation side,
   the outflow passage merging into an outflow channel extending in an axial direction, at least one of the two control connections A, B connectable with the outflow connection T via the outflow channel, and the outflow connection T being situated in an area between a second end of the control valve, opposite from the first end, and the two control connections A, B.

2. The control valve as recited in claim 1 wherein the outflow channel is at least partially enclosed by the pressure medium-conducting insert, external dimensions of the pressure medium-conducting insert being adapted to internal dimensions of the receptacle of the valve housing, and the outflow channel being formed at an interface between the valve housing and the pressure medium-conducting insert.

3. The control valve as recited in claim 2 wherein the pressure medium-conducting insert includes a radially interior sleeve-shaped component and an outer sleeve-shaped component, the outer sleeve-shaped component being manufactured as an injection-molded part and the inner sleeve-shaped component being designed as an insert component extrusion-coated by the outer sleeve-shaped component during an injection molding process for the outer sleeve-shaped component.

4. The control valve as recited in claim 2 wherein the pressure medium-conducting insert is manufactured in one piece from plastic or steel.

5. The control valve as recited in claim 1 wherein the inflow connection P is fluidically connectable with the control groove and the two control connections A, B via the inflow passage, the inflow groove, and a piston cavity.

6. The control valve as recited in claim 5 wherein the inflow connection P is situated in an area of the second end of the control valve, the control connection A and the control connection B adjoining axially in a direction of the first end, and the outflow connection T being situated in a direction of the second end.

7. The control valve as recited in claim 6 wherein the control piston has a circumferential inflow groove in the area of the second end, the control piston having a circumferential outflow groove A, a control groove, and an outflow groove B adjoining axially in the direction of the first end.

8. The control valve as recited in claim 7 wherein the outflow connection T is situated in the area of the second end at the front side of the control valve.

9. The control valve as recited in claim 1 wherein a check valve made up of a spring strip with overlapping ends wound to form a cylindrical valve spring is situated within a piston cavity.

10. An internal combustion engine comprising:
a camshaft adjustment device; and
a control valve including a valve housing situated in a receptacle of a camshaft and which includes an outflow connection T, two control connections A and B, and an inflow connection P situated within the camshaft, and a pressure medium-conducting insert, situated in a receptacle of the valve housing, and having an inflow passage, an outflow passage, and two control passages, and a control piston guided in the pressure medium-conducting insert and on an outer circumference having an inflow groove, an outflow groove, and a control groove,
the outflow passage merging into an outflow channel extending in an axial direction, whereby the outflow connection T is connectable with the two control connections A, B, and the outflow connection T is connected, via a connection in the camshaft, to a cavity, a hydraulic medium line, or a volume accumulator.

* * * * *